(No Model.) 2 Sheets—Sheet 1.

D. A. GARVER & C. H. STRAIGHT.
L. W. WILDER, Administrator of C. H. STRAIGHT, deceased.
TWO WHEELED VEHICLE.

No. 396,382. Patented Jan. 15, 1889.

Witnesses.
Chas. R. Burr
Thomas Durant.

Inventors
David A. Garver and
Clarence H. Straight
by Alex J. Stewart
their Attorney.

(No Model.) 2 Sheets—Sheet 2.

D. A. GARVER & C. H. STRAIGHT.
L. W. WILDER, Administrator of C. H. STRAIGHT, deceased.
TWO WHEELED VEHICLE.

No. 396,382. Patented Jan. 15, 1889.

Witnesses.
Chas. R. Burr.
Thomas Durant.

Inventors.
David A. Garver and
Clarence H. Straight
by their Attorney.

UNITED STATES PATENT OFFICE.

DAVID A. GARVER AND CLARENCE H. STRAIGHT, OF BRYAN, OHIO; L. W. WILDER ADMINISTRATOR OF SAID CLARENCE H. STRAIGHT, DECEASED.

TWO-WHEELED VEHICLE.

SPECIFICATION forming part of Letters Patent No. 396,382, dated January 15, 1889.

Application filed September 8, 1888. Serial No. 284,878. (No model.)

*To all whom it may concern:*

Be it known that we, DAVID A. GARVER and CLARENCE H. STRAIGHT, of Bryan, in the county of Williams and State of Ohio, have invented certain new and useful Improvements in Two-Wheeled Vehicles or Road-Carts; and we do hereby declare the following to be a full, clear, and exact description of the same, reference being had to the accompanying drawings, forming a part of this specification, and to the figures and letters of reference marked thereon.

Our present invention relates to certain improvements in that class of two-wheeled vehicles known as "sulkies" or "road-carts," particularly such as are adapted to carry but a single person, the object of the invention being to simplify and improve the construction and arrangement of the parts of such vehicles, whereby the rider is made more comfortable and secure in his seat, said seat being brought up close to the horse and supported upon springs, the tension of which is adapted to be adjusted to give the maximum ease of movement while supporting any particular weight, and at the same time maintain the seat at the proper level.

To these ends the invention consists in certain novel features of construction and combinations and arrangements of parts, all as will be hereinafter described, and pointed out particularly in the claims at the end of this specification.

Figures 1, 4:
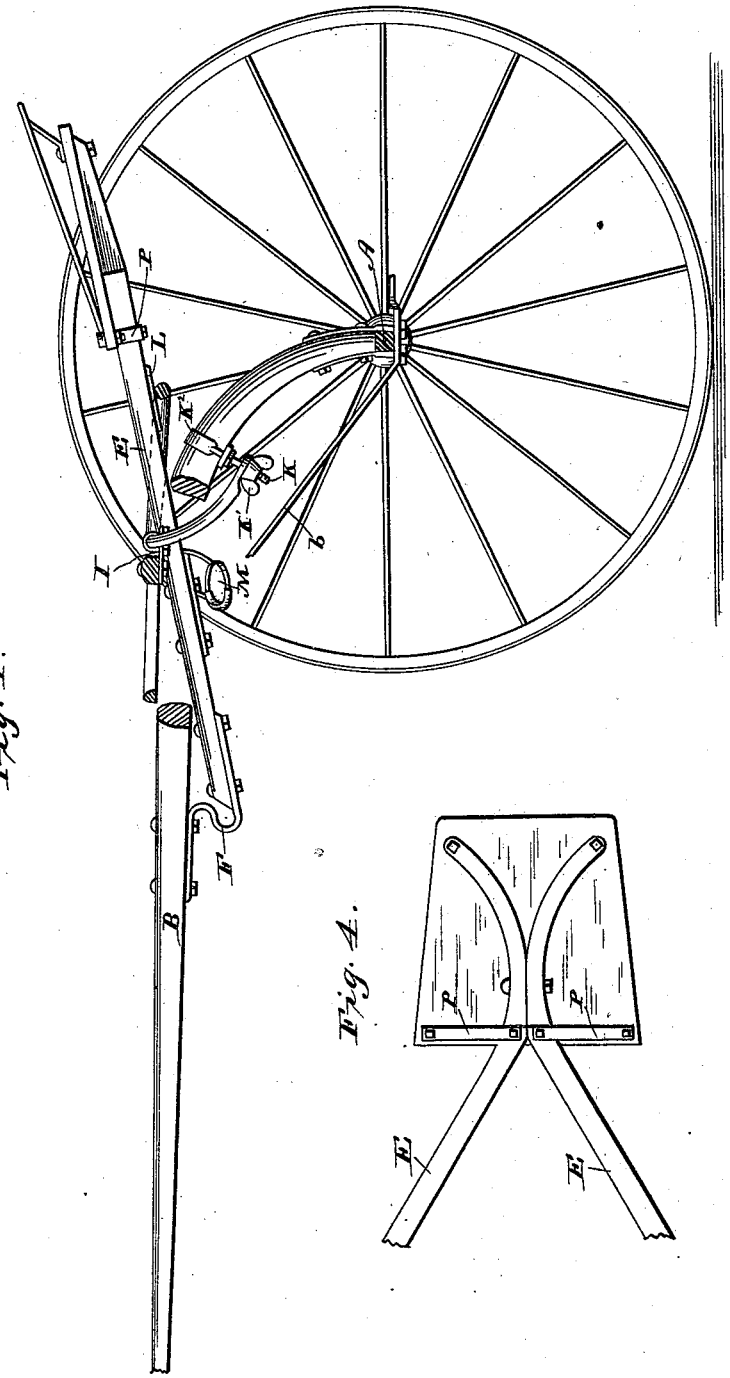
Figure 2:
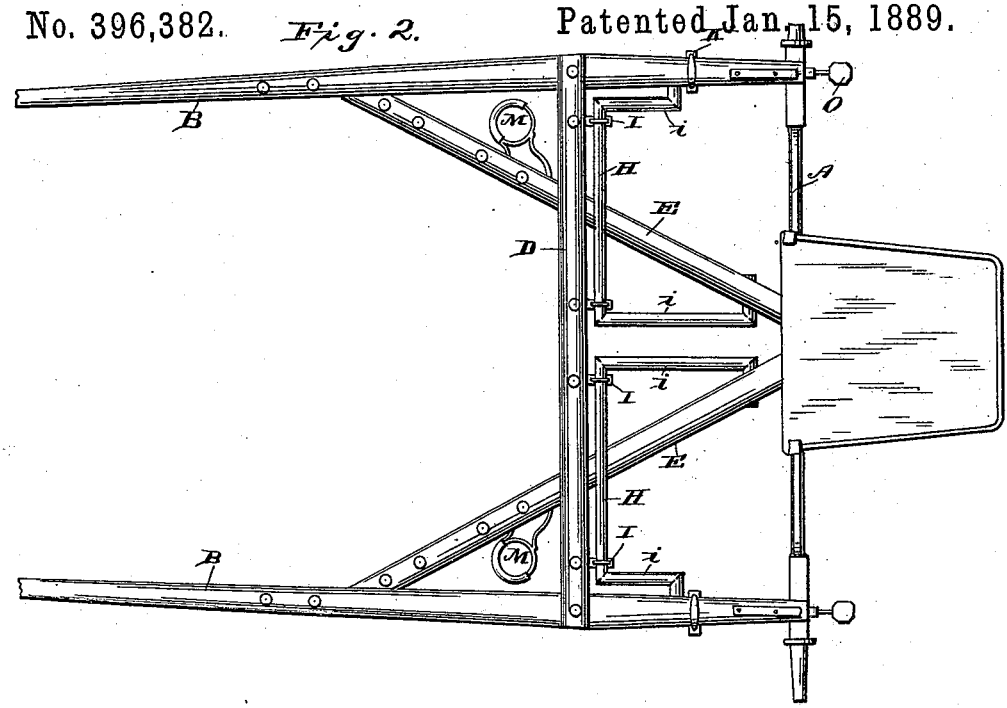
Figure 3:
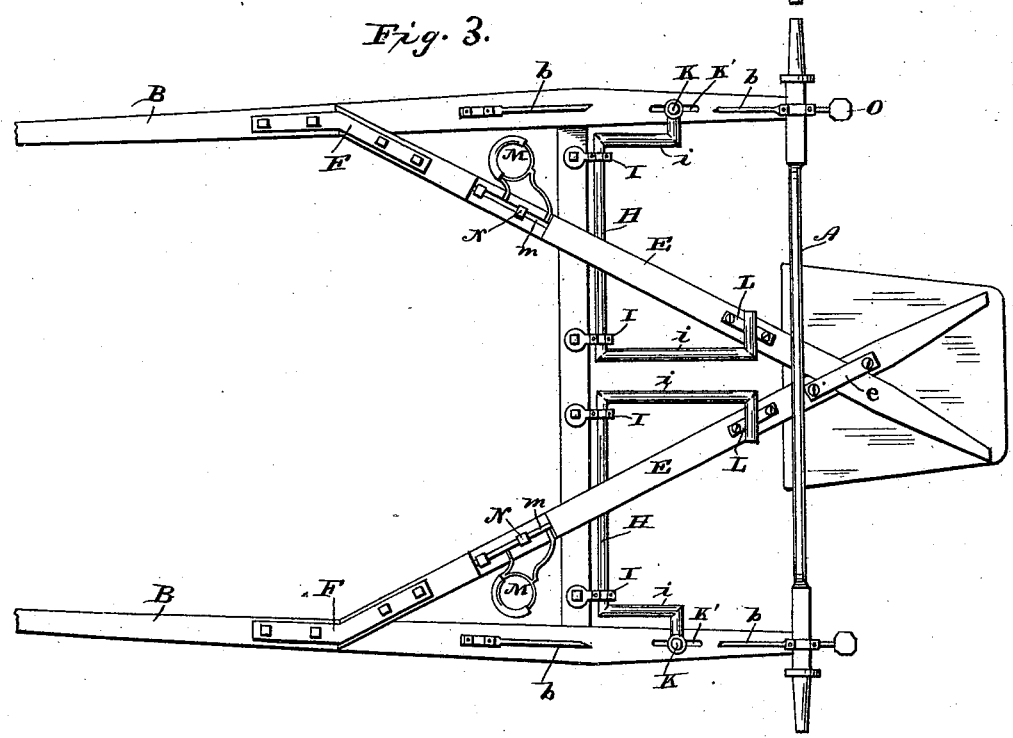

In the accompanying drawings, Figure 1 is a side elevation of a two-wheeled vehicle constructed in accordance with our invention, the shaft being broken away to more clearly illustrate the operative parts. Figs. 2 and 3 are top and bottom plan views, respectively, of the vehicle. Fig. 4 is a bottom plan view of a modified form of seat-bars.

Similar letters of reference in the several figures indicate the same parts.

The axle A, carrying the two running wheels, is preferably curved upward at the center to afford greater clearance for the horse's feet beneath, and the shafts B B are connected thereto by clips or otherwise, small brace-rods $b$ being extended from the axle to the shafts at a point beyond the curve. The usual cross-piece, D, connects the shafts some distance forward of the axle, said piece being in the present instance somewhat thicker than ordinarily, in order to afford the necessary support for the springs, as will presently appear.

The seat G is supported by two seat-bars, E E, united to the shafts some distance forward of the cross-piece D by substantially S-shaped springs F, said bars being brought together at a point just beneath or, if desired, forward of the front edge of the seat, as shown in Fig. 3, where they cross and are extended back to the rear edge of the seat. The bars are each notched or cut away at the point where they cross, making a smooth joint and giving both bars a bearing on the seat, the two being held together by a plate, $e$, secured to the upper one and bridging the lower one, as shown clearly in said last-mentioned figure.

The seat-bars, it will be seen, pass beneath the cross-bar the proper inclination to bring the seat up high enough without unduly shortening the bars, being secured by the S-shaped springs, which permit the forward ends of said bars to lie some distance below the shafts, and also permit them considerable range of movement in either direction.

The rear ends of the seat-bars are supported by torsion-springs, one on each side, acting independently each on its own bar. The central part, H, of these springs is parallel with and loosely secured to the cross-bar D at two or more points by clips I, or in any preferred manner. Both ends of the springs are bent rearward, the outer ends, $i$, running parallel with the shafts a short distance, and then being bent in under the same and connected thereto by an adjustable connection formed by the bolt K and set-nut K', secured to the shaft by clip K². The opposite or inner ends of the springs $i'$ are somewhat longer than the outer ends and extend back between the two seat-bars, the extreme ends being bent in under such bars, which rest loosely thereon, a suitable wear-plate, L, being, if desired, secured to the bars at the point of contact. By thus bringing the seat-bars close together and locating the springs between them a clear space is left for the rider's feet at either side, and at the same time full clearance is allowed for the horse's feet beneath, and as there is no foot-board to interfere the horse may be coupled very close to the axle.

The foot-rests are in the form of stirrups M, located one on either side and connected to the seat-bars below the level of the cross-bar in such manner as to be longitudinally adjustable thereon to suit different-sized riders. Such adjustable connection is formed by clipping or bolting rods $m$ to the seat-bars and mounting the stirrups thereon, a set-nut, N, being located on the rod M to secure the stirrup at the proper point.

It will be noted that the seat-bars are beneath the cross-piece and the springs are close in to the cross-piece at the sides, thus leaving nothing in the way of free access to the stirrups, nor is there danger with such construction of the rider's feet or legs coming in contact with any parts of the vehicle while riding over rough ground or while mounting or dismounting from the seat.

To assist the rider in mounting to his position, a step, O, is clipped to the axle at one side or the other, preferably by one of the clips which unite the shafts thereto.

It is obvious that the seat-bars may be brought near together to enable the rider to sit astride of them without being crossed, as shown, for instance, in Fig. 4, wherein the ends of the bars are curved, and after being brought close together extend outward to the rear corners of the seat, suitable bolts and straps, P, being provided to hold the seat in place. It is also obvious that other well-known means may be employed to adjust the tension of the springs, and we do not wish to be limited to the specific construction herein set forth.

In the practical use of a vehicle constructed in accordance with our invention it will be found that the seat has an exceedingly easy movement, the rider receiving no jar from the axle or shafts, as his feet and body are supported entirely upon springs, the S-shaped springs at the front permitting a ready limited movement of the bars at the front end and the torsion-springs permitting a great range of movement at the rear ends, the excessive movement of the bars in an upward direction being arrested by the cross-bar.

Having thus described our invention, what we claim as new, and desire to secure by Letters Patent, is—

1. In a two-wheeled vehicle, the combination, with the axle and shafts connected thereto, of seat-bars connected to the shafts at the forward ends and brought together at the rear ends at a point near the center of the front edge of the seat, and springs for supporting said bars, substantially as described.

2. In a two-wheeled vehicle, the combination, with the axle and shafts connected thereto, of seat-bars connected to the shafts at the forward ends and extended back and crossed at substantially the center of the front edge of the seat, the crossed ends forming the support for the seat, and springs for supporting said bars, substantially as described.

3. In a two-wheeled vehicle, the combination, with the axle and shafts connected thereto, the seat-bars connected to the shafts at the forward ends and brought close together at the rear ends, forming the support for the seat, and the cross-bar connecting the shafts, of the torsion-springs mounted on and parallel with the cross-bar, the ends being extended at right angles and engaging the shafts and seat-bars, respectively, substantially as described.

4. In a two-wheeled vehicle, the combination, with the axle, shafts connected thereto, cross-bar uniting the shafts, and the seat-bars, of torsion-springs lying parallel with and in proximity to the cross-bar, one end of each of said springs being adjustably connected to the shaft and the opposite end engaging the seat-bars to support the same, substantially as described.

5. In a two-wheeled vehicle, the combination, with the axle, the shafts connected thereto, the cross-piece uniting the shafts, and the seat-bars, of the torsion-springs mounted on the cross-piece, the outer ends of said springs being bent backward and connected to the shafts and the inner ends bent backward at points between the seat-bars and engaging said bars to support the same, whereby the space at either side of the seat-bars is unobstructed, substantially as described.

6. In a two-wheeled vehicle, the combination, with the axle, the shafts connected thereto, and the cross-piece uniting the shafts, of the seat-bars connected to the shafts by substantially S-shaped springs and extended backward beneath the cross-piece, and torsion-springs mounted on and parallel to the cross-piece with the backwardly-extending ends for supporting said bars, substantially as described.

7. In a two-wheeled vehicle, the combination, with the axle, the shafts connected thereto, the cross-bar, and the seat-bars connected to the shafts at the forward ends by the substantially S-shaped springs and extending backward beneath the cross-bar, of the seat supported on the rear ends of the seat-bars and the stirrups or foot-rests mounted on said seat-bars at the forward ends, substantially as described.

8. In a two-wheeled vehicle, the combination, with the axle, shafts connected thereto, seat-bars united to the shafts at the forward ends by substantially S-shaped springs, and the cross-piece uniting the shafts, of torsion-springs mounted on the cross-piece and bent at the ends to engage the shafts and seat-bars, respectively, the seat on said bars at the rear, and the foot-rests or stirrups thereon at the forward ends, substantially as described.

9. In a two-wheeled vehicle, the combination, with the axle, the shafts connected thereto, the cross-piece uniting the shafts, and the seat-bars connected to the shafts at the forward ends, of the torsion-springs engaging the seat-bars to elevate the same and connected to the under side of the shafts by the bolt, set-nut, and clip, whereby the tension of said springs may be adjusted, as set forth.

10. In a two-wheeled vehicle, the combination, with the shafts B B, of cross-piece D, springs H, having rearward extensions $i\ i'$, clips I, the seat-bars E, and wear-plates L, substantially as described.

DAVID A. GARVER.
CLARENCE H. STRAIGHT.

Witnesses:
WARREN MILLER,
ED. GARVER.